Jan. 14, 1930.  G. H. HUFFERD  1,743,672
UNIVERSAL COUPLING
Filed Oct. 1, 1926
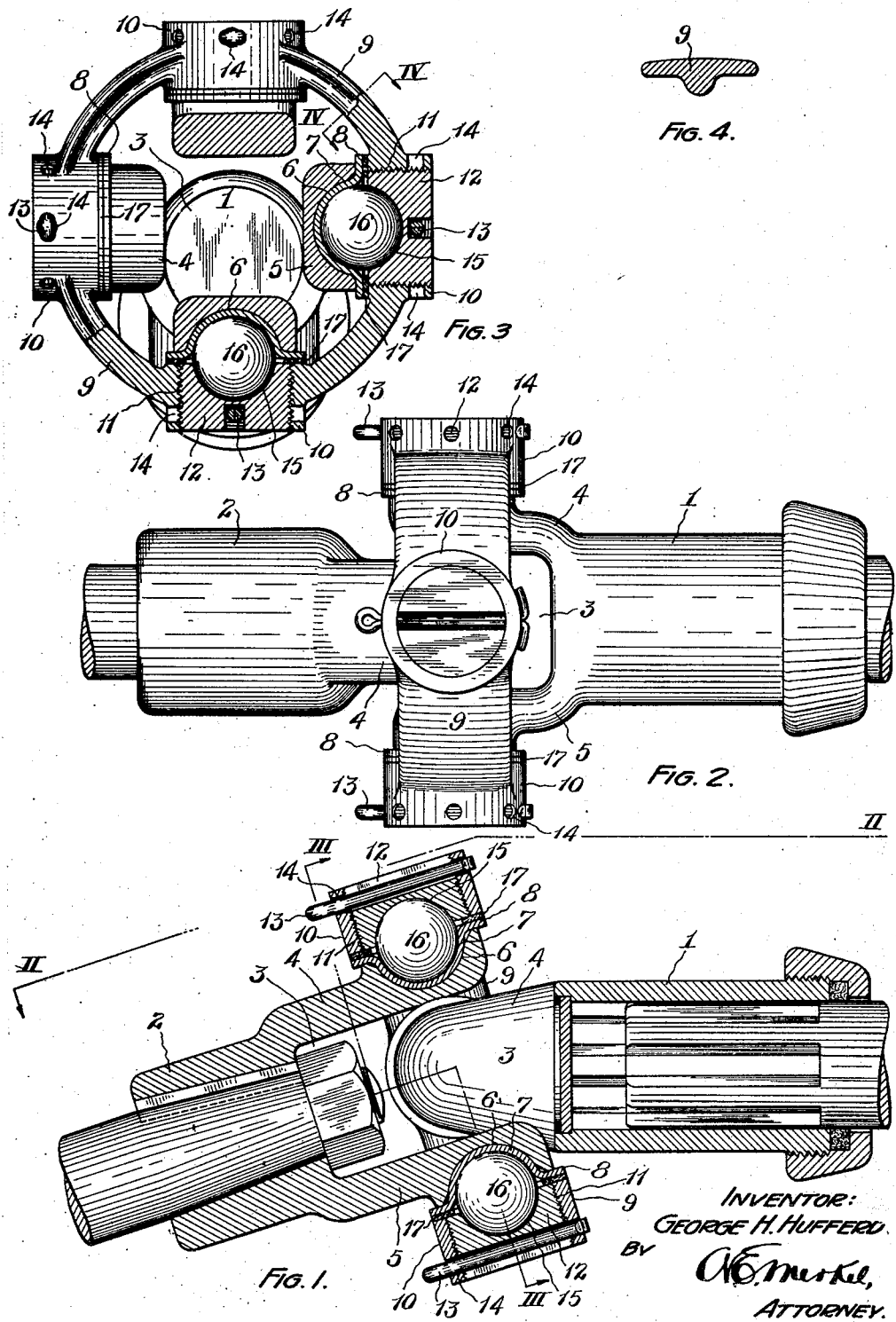
INVENTOR:
GEORGE H. HUFFERD.
BY
ATTORNEY.

Patented Jan. 14, 1930

1,743,672

UNITED STATES PATENT OFFICE

GEORGE H. HUFFERD, OF DETROIT, MICHIGAN, ASSIGNOR TO THOMPSON PRODUCTS INC., OF CLEVELAND, OHIO, A CORPORATION OF OHIO

UNIVERSAL COUPLING

Application filed October 1, 1926. Serial No. 138,998.

The invention relates to universal couplings adapted to transmit rotary motion from a driving member, such as the transmission shaft of an automobile which gives a rotary motion to the rear wheels.

Universal couplings have been constructed in many different forms, many of which are complicated and expensive to manufacture. It is the object of this invention to provide a construction which will effectively perform the functions desired in a universal coupling but which will be comparatively simple in its parts, cheap in manufacturing cost, and safe and durable in use.

This invention is a species of the generic idea disclosed and claimed in an application filed by me of even filing date herewith, Oct. 1, 1926, Serial No. 138,999. The copending application discloses a coupling in which there are driving and driven members each provided with a pair of heads in separated relation, one pair being set at right angles to the other pair and each head being connected to an intermediate member lying within the heads, by means of balls which serve also as the pivotal connections for the universal joint. In the present embodiment the intermediate member is outside of the heads on the driving and driven members.

The invention consists in the construction and arrangement of parts hereinafter described and claimed.

In the annexed drawings:

Figure 1 is a vertical longitudinal section through the improved coupling.

Fig. 2 is a plan view taken on line II—II of Fig. 1.

Fig. 3 is a vertical section taken on line III—III of Fig. 1.

Fig. 4 is a cross section through the ring forming the intermediate member, taken on line IV—IV of Fig. 3.

Referring to the drawings in detail in which the same reference number is used throughout to designate the same part, the numerals 1 and 2 designate the driving and driven members, although it is to be understood that either may be the driving member. Each of these members is bifurcated by a slot 3 to form two arms 4 and 5, which are made thick enough to admit the formation of hemispherical recesses 6 near the free ends thereof. These free ends might be of hardened material so that the recesses 6 would serve as bearing surfaces, or the surfaces of the recesses might be hardened, but I prefer to construct the driving and driven members of ordinary material and line the hemispherical recesses with plates 7 of wear-resisting material having outer annular flanges 8. Surrounding the bifurcated ends of the driving and driven member is an intermediate member 9 which may be of any suitable form but as shown it consists of a ring having a plurality of enlargements 10 provided with radial threaded bores 11 adapted to receive externally threaded plugs 12 held in adjusted relation by any suitable means, the means shown consisting of cotter pins 13 passing through a diametrically arranged pair of a plurality of apertures 14 in the enlargement 10 and through a slot in the outer end of the plug 12. The plug 12 is preferably of hardened material formed at the inner end with a hemispherical ball bearing surface 15. If desired the bore 11 may be made of a length such that a separate plug may be used to secure and adjust the bearing member 12, in which case the latter need not be threaded into the bore 11, and an anti-rattle spring might be inserted between the two parts.

The hemispherical seats in the intermediate ring member and those in the bifurcated ends of the driving and driven members are adapted to register and in the spherical recesses formed thereby balls 16 are inserted which serve both as a connecting means between the driving, driven and intermediate members, and as pivotal means to enable the parts to function as a universal joint.

Between the flange 8 on the bearing plate 7 and the inner surface of the ring 9 it is found desirable to insert a dust excluding washer 17.

In this form of device the material of which the driving and driven members are fabricated will generally have some resiliency and as the balls 16 have a cam surface, in transmitting the torque from the driving to the driven member there will be a tendency constantly to press the ball seats into snug contact with the balls. Therefore, in this form there is a tendency automatically to take up wear in the joint without the aid of anti-rattle means so that the outer ball seat may be directly threaded into the bore 11 thereby reducing the length of this bore and making a very compact and simple universal joint.

The specific means shown is subject to variation and it is therefore to be understood that my invention is not confined to the specific details shown but includes all changes and modifications falling within the terms of the appended claims.

What I claim is:

1. In combination, a bifurcated driving member, a bifurcated driven member, each furcation being provided with a semi-spherical socket therein, a wear resisting member for each socket and shaped to be seated therein, a connecting member in each of said sockets, and an intermediate member surrounding said furcations and provided with spaced sockets each for receiving a portion of one of said connecting members, said furcations being semi-resilient so as to press against said connecting members at all times to keep said wear resisting members in said sockets and to thereby compensate for wear of the parts.

2. In combination, a bifurcated driving member, a bifurcated driven member, each of the furcations of the said members having a semi-spherical socket therein near the fore end thereof, a cupped wear-resisting plate lining in each of said sockets having a flange overlying that portion of the furcation defining the socket, a ball seated in each of the cupped plates, and a ring having enlarged portions spaced therearound and provided with shoulders for cooperation with the flanges of said plates to hold them in said sockets, and a plug having a semi-spherical seat in each of said portions and in engagement with one of said balls.

Signed by me this 7th day of September, 1926.

GEO. H. HUFFERD.